(12) United States Patent
Goldman et al.

(10) Patent No.: US 8,149,925 B2
(45) Date of Patent: Apr. 3, 2012

(54) CHASE ALGORITHM BASED DIFFERENTIAL DECODER FOR SOFT DECISION REED SOLOMON DECODING IN A QAM SYSTEM

(75) Inventors: Naor Goldman, Moshav Ein-Vered (IL); Naftali Sommer, Rishon Letzion (IL)

(73) Assignee: Intel Corporation, Santa Clara, CA (US)

( * ) Notice: Subject to any disclaimer, the term of this patent is extended or adjusted under 35 U.S.C. 154(b) by 1413 days.

(21) Appl. No.: 11/689,038

(22) Filed: Mar. 21, 2007

(65) Prior Publication Data

US 2007/0223597 A1 Sep. 27, 2007

Related U.S. Application Data

(60) Provisional application No. 60/785,731, filed on Mar. 23, 2006.

(51) Int. Cl.
*H04N 7/12* (2006.01)
*H04N 11/02* (2006.01)
*H04N 11/04* (2006.01)

(52) U.S. Cl. ......... 375/240.27; 375/240.25; 375/240.26

(58) Field of Classification Search .................. 375/240, 375/240.01–240.29
See application file for complete search history.

(56) References Cited

U.S. PATENT DOCUMENTS

| | | | |
|---|---|---|---|
| 5,978,950 A * | 11/1999 | Im | 714/752 |
| 6,268,767 B1 * | 7/2001 | Maalej et al. | 329/304 |
| 6,460,160 B1 | 10/2002 | Classon | |
| 6,654,926 B1 * | 11/2003 | Raphaeli et al. | 714/780 |
| 6,985,531 B2 | 1/2006 | McCarty, Jr. | |
| 7,362,838 B2 * | 4/2008 | Mizukami et al. | 375/362 |
| 2003/0128746 A1 | 7/2003 | Lerner et al. | |
| 2005/0220220 A1 * | 10/2005 | Belotserkovsky | 375/316 |

FOREIGN PATENT DOCUMENTS

WO WO 02/31983 A1 4/2002

* cited by examiner

*Primary Examiner* — Eleni Shiferaw
*Assistant Examiner* — Jing Sims
(74) *Attorney, Agent, or Firm* — Grossman, Tucker, Perreault & Pfleger, PLLC

(57) ABSTRACT

A novel apparatus and method of differential decoding for use in a communication system such as a cable system. The differential decoding mechanism of the present invention enables the use of the Chase algorithm for Reed Solomon (RS) codes (i.e. non-binary codes). The mechanism is well suited for use in systems employing QAM data modulation/demodulation techniques and that also incorporate use of a differential encoder such as in DOCSIS capable cable modem systems. The differential decoding mechanism is operative to analyze the input to the differential decoder and adjust the decoding action accordingly. The mechanism generates the first and second candidate constellation points needed by the Chase algorithm. Considering the differential encoding, there are four possible constellation candidates. The differential decoder reduces these four possible options to two by eliminating from consideration two of them. Depending on the number of symbols to be improved by the Chase algorithm, this reduction can potentially reduce the number of options significantly.

23 Claims, 10 Drawing Sheets

_US 8,149,925 B2_

CHASE ALGORITHM BASED DIFFERENTIAL DECODER FOR SOFT DECISION REED SOLOMON DECODING IN A QAM SYSTEM

REFERENCE TO PRIORITY APPLICATION

This application claims priority to U.S. Provisional Application Ser. No. 60/785,731, filed Mar. 23, 2006, entitled "Chase algorithm for soft decision Reed Solomon decoder for a QAM system with a differential decoder", incorporated herein by reference in its entirety.

FIELD OF THE INVENTION

The present invention relates to the field of data communications and more particularly relates to a chase algorithm based differential decoder for soft decision Reed Solomon decoding in a QAM system.

BACKGROUND OF THE INVENTION

Many communications systems today use forward error correction (FEC) codes in order to improve data robustness in the presence of channel noise. In many systems, the FEC scheme used is the well known Reed Solomon (RS) encoding scheme. Reed Solomon codes are used in a wide variety of commercial applications, most prominently in CDs and DVDs, and in data transmission technologies such as DSL, DVB and WiMAX.

In a Reed-Solomon code, the data encoded is first visualized as a polynomial. The code relies on a theorem from linear algebra that states that any k distinct points uniquely determine a polynomial of degree at most k−1. The Reed Solomon error correction code functions by oversampling a polynomial constructed from the data. The polynomial is evaluated at several points, and these values are sent or recorded. By sampling the polynomial more often than is necessary, the polynomial is over determined. As long as a sufficient number of the points are received correctly, the receiver can recover the original polynomial even in the presence of a few erroneous points.

The standard way to decode RS codes is by using a hard decision decoder that only uses the channel output after it is transformed to bits. Using the soft channel output (i.e. before slicing), however, can significantly improve performance. Several soft decoding algorithms are known in the art, but most of them have the disadvantage of having high implementation complexity.

The Chase algorithm is a well known algorithm for approximate soft decoding of binary error control codes with a well-defined trade-off between performance and complexity. The Chase algorithm begins by identifying the p least reliable codeword symbols of a received codeword and then enumerates all $2^p$ corresponding codewords while fixing the more reliable codewords. The Chase algorithm decodes each of the $2^p$ codewords using a simple hard-decoding algorithm. Finally, the Chase algorithm chooses the candidate codeword that the hard decoder was able to decode.

Differential decoding is a technique used in digital communications to provide unambiguous signal reception when using some types of modulation. It makes transmitted data depend not only on the current bit (or symbol), but also on the previous one. Common types of modulation that require differential coding include phase shift keying and quadrature amplitude modulation (QAM).

To demodulate a BPSK signal, for example, a local oscillator must be made synchronous to the remote one. This is accomplished using a carrier recovery circuit. A carrier can be recovered in different ways, however, depending upon a count of valid phases (two for BPSK). For this coding, if a carrier signal is recovered incorrectly, the received data is inverted. Using differential decoding, determining what was transmitted depends only on the difference between two consecutive received symbols and not on their absolute values. Thus, regardless of whether the data stream is inverted, the decoded data will always be correct.

Differential coding applies to symbols as opposed to bits. To resolve 180 degree ambiguity, single bits used as the symbols are sufficient. When dealing with ambiguity of 90 degree, pairs of bits are used Three bits are used to resolve 45 degree ambiguity (e.g., in 8-PSK).

A system that employs a differential encoder/decoder is robust to constant phase shifts of 90 degrees, 180 degrees and 270 degrees in the QAM constellation. The differential encoder encodes the two MSBs of the constellation point, which are the bits that define the quadrant the constellation point is located in.

A problem arises, however, when the Chase algorithm is used in a system that incorporates a differential decoder. The Chase algorithm is difficult to implement in a system that employs a differential encoder/decoder. This is because the algorithm requires the QAM demodulator to output two hard decision candidates for each constellation point. The first candidate has a better probability to be the correct decision than the second candidate. If the first and second candidates are located in different quadrants, then a trellis scheme of two branches is required. Since the differential decoder has a memory of length one (i.e. one for I and one for Q), the two branches are further split into a maximum of four branches. Keeping tracking of this four branch trellis is complicated and could require significantly more memory depending on the system.

For example, consider a RS system with a 192 symbol block length. The Chase algorithm attempts to improve the soft value reliability of the three worst detected symbols. Given four trellis branches for each symbol yields $4^3=64$ iterations. In most cases, doing this is impractical because of the computing resources, time and expense required to implement it.

It is thus desirable to have a mechanism that provides a means of differential decoding the demodulator output that overcomes the disadvantage of the prior art. It is further desirable that the different decoding mechanism perform the decoding of the demodulated symbols to generate soft value information required by FEC decoders such as those implementing Reed Solomon decoding without the large computing resources and cost required of prior art mechanisms.

SUMMARY OF THE INVENTION

The present invention is a novel apparatus and method of differential decoding for use in a communication system such as a cable system. The differential decoding mechanism of the present invention enables the use of the Chase algorithm for Reed Solomon (RS) codes (i.e. non-binary codes). The mechanism is well suited for use in systems employing QAM data modulation/demodulation techniques and that also incorporate use of a differential encoder. One possible use of the mechanism is in DOCSIS capable cable modem systems.

In operation, the differential decoding mechanism is operative to analyze the input to the differential decoder and adjust the decoding action accordingly. The mechanism generates the first and second candidate constellation points needed by the Chase algorithm. Considering the differential encoding, there are four possible constellation candidates. The differential decoder reduces these four possible options to two by eliminating from consideration two of them. Depending on the number of symbols to be improved by the Chase algorithm, this reduction can potentially reduce the number of options significantly.

Use of the differential decoding mechanism improves system performance with a very low design effort and gate count. The decoder provides a good alternative to other RS soft decoding algorithms which can be very complicated, especially for high error correction capabilities. The decoder described herein is applicable to the case of QAM modulated data that incorporates differential encoding.

The main benefits of the differential decoder mechanism include (1) improved decoding performance; (2) ability to retain use of the hard decision Reed Solomon decoder as a building block; (3) very small design effort required; and (4) a very small amount of additional hardware is required compared to the simple hard decision algorithm.

To aid in understanding the principles of the present invention, the description is provided in the context of a differential decoder suitable for use in a cable system such as a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any system that employs differential encoding/decoding and FEC decoding such as Reed Solomon decoding.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of differential decoding for use in a differential decoder having a first branch for a first candidate and a second branch for a second candidate, the method comprising the steps of determining whether a previous decoder input is a boundary point, and if not, applying a current first candidate to a first differential decoder in the first branch, applying a current second candidate to a second differential decoder in the second branch and setting an output score to a current input score, if a previous decoder input is a boundary point and a current input score is greater then a previous input score, applying a current first candidate to the first differential decoder and the second differential decoder and setting the output score to the previous input score and if a previous decoder input is a boundary point and a current input score is not greater then a previous input score, setting a memory of the second differential decoder to value of memory of the first differential decoder, applying a current first candidate and a current second candidate to the first differential decoder and second differential decoder, respectively, and setting the output score to a current input score.

There is also provided in accordance with the present invention, a differential decoder comprising a memory for storing a current decoder input and a previous decoder input each comprising a first candidate, a second candidate and a reliability score, a first branch comprising a first differential decoder and corresponding to the first candidate, a second branch comprising a second differential decoder and corresponding to the second candidate, a processing circuit operative to determine whether a previous decoder input is a boundary point, and if not, apply a current first candidate to the first differential decoder, apply a current second candidate to the second differential decoder, apply a current first candidate to the first differential decoder and the second differential decoder if a previous decoder input is a boundary point and a current input score is greater then a previous input score and set a second differential decoder memory to the contents of a first differential decoder memory, apply a current first candidate and a current second candidate to the first differential decoder and the second differential decoder, respectively, if a previous decoder input is a boundary point and a current input score is not greater then a previous input score.

There is further provided in accordance with the present invention, a method of differential decoding, the method comprising the steps of providing a first branch for a first candidate and a second branch for a second candidate, wherein the first branch and the second branch are decoded by a first differential decoder and second differential decoder, respectively, applying a current first candidate and current second candidate to the first differential decoder and the second differential decoder, respectively, if a previous decoder input is not a boundary point, eliminating a second candidate of a current decoder input if a previous decoder input is a boundary point and a current input score is greater then a previous input score and eliminating a second candidate of a previous decoder input if a previous decoder input is a boundary point and a current input score is not greater then a previous input score.

There is also provided in accordance with the present invention, a cable modem comprising a memory, one or more interface ports, a tuner coupled to a CATV cable having a plurality of channels, the tuner operative to tune a received broadband signal in accordance with a tune command, a PHY circuit coupled to the tuner and operative to generate a baseband signal from the output of the tuner, the PHY circuit comprising a differential decoder unit, the differential decoder unit comprising a memory for storing a current decoder input and a previous decoder input each comprising a first candidate, a second candidate and a reliability score, a first branch comprising a first differential decoder and corresponding to the first candidate, a second branch comprising a second differential decoder and corresponding to the second candidate, a processing circuit operative to determine whether a previous decoder input is a boundary point, and if not, apply a current first candidate to the first differential decoder, apply a current second candidate to the second differential decoder, apply a current first candidate to the first differential decoder and the second differential decoder if a previous decoder input is a boundary point and a current input score is greater then a previous input score, set a second differential decoder memory to the contents of a first differential decoder memory, apply a current first candidate and a current second candidate to the first differential decoder and the second differential decoder, respectively, if a previous decoder input is a boundary point and a current input score is not greater then a previous input score and a processor coupled to the memory, the one or more interface ports, the tuner and the PHY circuit, the processor operative to implement a media access control (MAC) layer.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
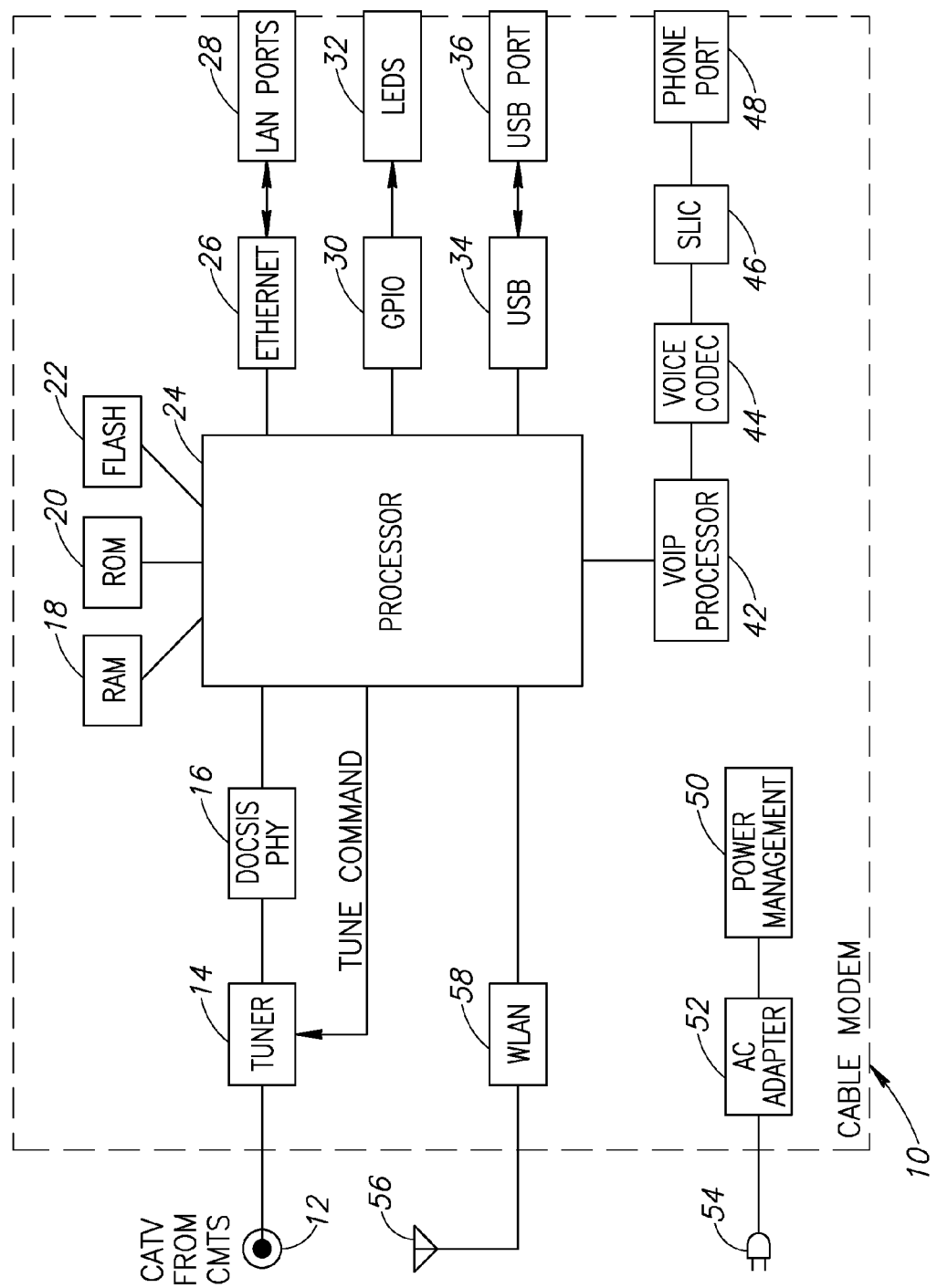
FIG. 1 is a block diagram illustrating an example cable modem system incorporating the differential decoding mechanism of the present invention.

The following notation is used throughout this document.

| Term | Definition |
| --- | --- |
| AC | Alternating Current |
| ASIC | Application Specific Integrated Circuit |
| BPSK | Binary Phase Shift Keying |
| CATV | Community Antenna Television or Cable TV |
| CD | Compact Disc |
| CMTS | Cable Modem Termination System |
| CO | Central Office |
| CPU | Central Processing Unit |
| DC | Direct Current |
| DOCSIS | Data Over Cable Service Interface Specification |
| DSL | Digital Subscriber Line |
| DSP | Digital Signal Processor |
| DVB | Digital Video Broadcast |
| DVD | Digital Versatile Disk |
| EEROM | Electrically Erasable Read Only Memory |
| FEC | Forward Error Correction |
| FPGA | Field Programmable Gate Array |
| GPIO | General Purpose I/O |
| HDL | Hardware Description Language |
| I/O | Input/Output |
| IC | Integrated Circuit |
| IP | Internet Protocol |
| LAN | Local Area Network |
| LED | Light Emitting Diode |
| LLR | Log Likelihood Ratio |
| MAC | Media Access Control |
| MSB | Most Significant Bit |
| POTS | Plain Old Telephone Service |
| PSK | Phase Shift Keying |
| QAM | Quadrature Amplitude Modulation |
| RAM | Random Access Memory |
| RF | Radio Frequency |
| ROM | Read Only Memory |
| RS | Reed Solomon |
| SLA | Service Level Agreement |
| SLIC | Subscriber Line Interface Card |
| SNR | Signal to Noise Ratio |
| USB | Universal Serial Bus |
| VoIP | Voice over IP |
| WiMAX | Worldwide Interoperability for Microwave Access |
| WLAN | Wireless Local Area Network |

DETAILED DESCRIPTION OF THE INVENTION

The present invention is a novel apparatus and method of differential decoding for use in a communication system such as a cable system. The differential decoding mechanism of the present invention enables the use of the Chase algorithm for Reed Solomon (RS) codes (i.e. non-binary codes). The mechanism is well suited for use in systems employing QAM data modulation/demodulation techniques and that also incorporate use of a differential encoder. One possible use of the mechanism is in DOCSIS capable cable modem systems.

In operation, the differential decoding mechanism is operative to analyze the input to the differential decoder and adjust the decoding action accordingly. The mechanism generates the first and second candidate constellation points needed by the Chase algorithm. Considering the differential encoding, there are four possible constellation candidates. The differential decoder reduces these four possible options to two by eliminating from consideration two of them. Depending on the number of symbols to be improved by the Chase algorithm, this reduction can potentially reduce the number of options significantly.

To aid in understanding the principles of the present invention, the description is provided in the context of a differential decoder suitable for use in a cable system such as a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any system that employs differential encoding/decoding and FEC decoding such as Reed Solomon decoding.

Note that throughout this document, the term communications device is defined as any apparatus or mechanism adapted to transmit, or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof.

The term cable modem is defined as a modem that provides access to a data signal sent over the cable television infrastructure. The term voice cable modem is defined as a cable modem that incorporates VoIP capabilities to provide telephone services to subscribers. Channel bonding is defined as a load-sharing technique for logically combining multiple DOCSIS channels into a single virtual pipe. It is described in detail in the DOCSIS 3.0 specification, incorporated herein by reference in its entirety.

The word 'exemplary' is used herein to mean 'serving as an example, instance, or illustration.' Any embodiment described herein as "exemplary" is not necessarily to be construed as preferred or advantageous over other embodiments.

A boundary point of the sliver output (i.e. demodulator output) is defined as a point whose first candidate lies in one quadrant and whose second candidate lies in a different quadrant. The different manifested in their two MSBs.

Voice Cable Modem Incorporating Differential Decoder Based PHY

A block diagram illustrating an example cable modem comprising a PHY incorporating the differential decoder of the present invention is shown in FIG. 1. The cable modem, generally referenced 10, comprises a tuner 14, DOCSIS PHY circuit 16 operative to implement the differential decoder mechanism of the present invention, DOCSIS compatible processor 24, VoIP processor 42, voice codec 44, subscriber line interface card (SLIC) 46, phone port 48, antenna 56, wireless local area network (WLAN) 58, Ethernet interface 26, Ethernet LAN port 28, general purpose (I/O) (GPIO) interface 30, LEDs 32, universal serial bus (USB) interface 34, USB port 36, AC adapter 52, power management circuit 50, ROM 20, RAM 18 and FLASH memory 22. Note that in the example embodiment presented herein, the cable modem and DOCSIS enabled processor 24 are adapted to implement the DOCSIS 3.0 standard.

In operation, the cable modem processor 24 is the core chip set which in the example presented herein comprises a central single integrated circuit (IC) with peripheral functions added. The voice over IP (VoIP) processor 42 implements a mechanism to provide phone service outside the standard telco channel. Chipset DSPs and codecs 44 add the functionality of POTS service for low rate voice data.

The cable modem also comprises a subscriber line interface card (SLIC) 46 which functions to provide the signals and functions of a conventional local loop to a plurality of telephone devices connected via the phone port 48 using internal 2-wire telephone wiring. In particular, it generates call progress tones including dial tone, ring tone, busy signals, etc. that are normally provided by the local loop from the CO. Since the telephone deices are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides −48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Connectivity is provided by a standard 10/100/1000 Mbps Ethernet interface 26 and Ethernet LAN port 28, USB interface 34 and USB port 36 or with additional chip sets, such as wireless 802.11a/b/g via WLAN interface 58 coupled to antenna 56. In addition, a GPIO interface 30 provides an interface for LEDs 32, etc. The network connectivity functions may also include a router or Ethernet switch core. Note that the Ethernet MAC 38 and PHY 16 are typically integrated into the cable modem processor 24 or may be separate as shown in FIG. 1 wherein the DOCSIS PHY circuit 16 is shown separate from the processor 24.

In the example embodiment presented herein, the tuner 14 is coupled to the CATV signal from the CMTS via port 12 and is operative to convert the RF signal received over the RF cable to an IF frequency in accordance with a tune command received from the processor.

The cable modem 10 comprises a processor 24 which may comprise a digital signal processor (DSP), central processing unit (CPU), microcontroller, microprocessor, microcomputer, ASIC, FPGA core or any other suitable processing means. The cable modem also comprises static read only memory (ROM) 20, dynamic main memory 18 and FLASH memory 22 all in communication with the processor via a bus (not shown).

The magnetic or semiconductor based storage device 18 (i.e. RAM) is used for storing application programs and data. The cable modem comprises computer readable storage medium that may include any suitable memory means, including but not limited to, magnetic storage, optical storage, semiconductor volatile or non-volatile memory, biological memory devices, or any other memory storage device.

Although in the example provided herein, the differential decoder is implemented in hardware, in alternative embodiments it could be implemented in software or a combination of hardware and software. Software adapted to implement the differential decoder mechanism of the present invention is adapted to reside on a computer readable medium, such as a magnetic disk within a disk drive unit. Alternatively, the computer readable medium may comprise a floppy disk, removable hard disk, Flash memory 22, EEROM based memory, bubble memory storage, ROM storage 20, distribution media, intermediate storage media, execution memory of a computer, and any other medium or device capable of storing for later reading by a computer a computer program implementing the system and methods of this invention. The software adapted to implement the differential decoder mechanism of the present invention may also reside, in whole or in part, in the static or dynamic main memories 18 or in firmware within the processor of the computer system (i.e. within microcontroller, microprocessor or microcomputer internal memory).

Chase Algorithm for Soft Reed Solomon Decoding

Figure 2:
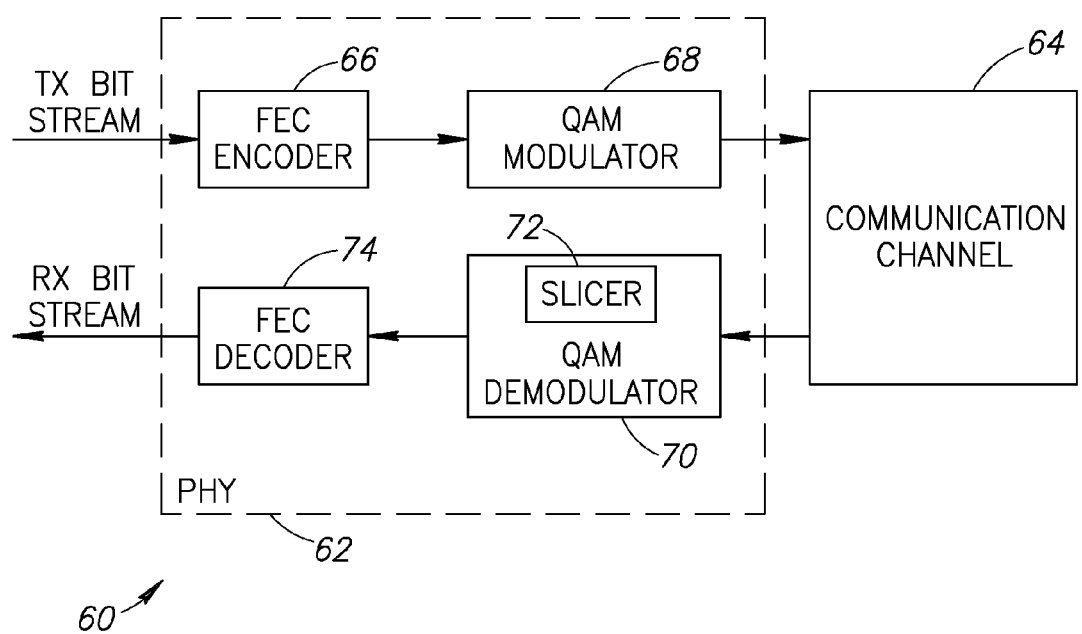
FIG. 2 is a block diagram illustrating a first example coding scheme without a differential decoder.

A block diagram illustrating a first example coding scheme without a differential decoder is shown in FIG. 2. The decoding scheme, generally referenced 60, comprises a PHY circuit 62 coupled to communications channel 64. The PHY circuit comprises a transmit portion comprising a FEC encoder 66 (e.g., Reed Solomon encoder) adapted to encode the TX bit stream and a QAM modulator 68. The PHY also comprises a receive portion comprising a QAM demodulator 70 incorporating a slicer 72 and FEC decoder 74 (e.g., Reed Solomon decoder) for generating the RX bit stream.

At the receiver portion, consider the following coding scheme wherein a reliability measure is calculated for every byte according to the slicer 72 soft input. In addition, the second best candidate for each byte is calculated. The Chase algorithm then enumerates over the $2^c$ possibilities to choose the c bytes with worst reliability measures where for each byte it enumerates only over the first and second best candidates. For each possibility, a hard RS decoding is performed. The Chase algorithm stops when a successful decoding is achieved.

Note that an RS code is assumed since it has a relatively large value of the correction capability noted by T. Typically, the c QAM symbols with the lowest reliability usually contain some errors. Therefore, the decoding capability is increased to T plus the number of errors in the c enumerated QAM symbols (instead of a total of T for the standard decoder).

The reliability measure is then calculated in accordance with the following. For a square QAM constellation and Gaussian noise, the reliability measure can be expressed as $$d_1^2 - d_0^2 \quad (1)$$

where $d_0$ is the distance between the soft slicer input and the closest constellation point;

$d_1$ is the distance between the soft slicer input and the second closest constellation point;

The worst reliability is 0, which occurs when the soft value lies exactly between two constellation points. This calculation assumes that the probability that the correct point is not one of these two is negligible, and then calculates the log likelihood ratio (LLR). It is assumed that the second best candidate is one of the four nearest neighbors of the best candidate, i.e. it differs only by the I value or the Q value. Therefore, the reliability can be calculated separately for I and Q and the final reliability is taken as the minimum of the I and Q reliabilities.

The error e is defined as the difference between the soft value and the best decision and can be expressed as $$e = e_r + je_q \quad (2)$$

where $e_r$ is the real portion of the error;

$e_q$ is the imaginary portion of the error;

The distance to the best I candidate is then $|e_r|$ and the distance to the second best candidate is $2-|e_r|$, assuming a spacing of two between constellation points. The I reliability can then be express as $$s_I = (2 - |e_r|)^2 - |e_r|^2 \quad (3)$$
$$= 4 - 4 \cdot |e_r| + |e_r|^2 - |e_r|^2$$
$$= 4 - 4 \cdot |e_r|$$

Note that the calculation in Equation 3 is for an inner constellation point. For a boundary point (i.e. +15 or −15 for 256-QAM with I values of −15, −13, ... −1, 1, ... 13, 15), where the soft value lies outside the constellation (i.e. larger then 15) the second best distance is $2+|e_r|$. Thus, the reliability is express as $$s_I = (2 + |e_r|)^2 - |e_r|^2 \quad (4)$$
$$= 4 + 4 \cdot |e_r|$$

In similar fashion, the Q reliability can be expressed as $$s_Q = 4 - 4 \cdot |e_q| \quad (5)$$

for an inner point and $$s_Q = 4 + 4 \cdot |e_q| \quad (6)$$

for a boundary point. The final reliability s for this byte is expressed as $$s = \min(s_I, s_Q) \quad (7)$$

Thus, the final reliability s is taken as the worse score between the I and Q scores. Note that a reliability score is assigned to each constellation symbol point and stored in memory. A smaller reliability score is worse since it means that the soft value lies somewhere in between and closer to the middle of two constellation points. Conversely, a higher reliability score is better since it means that the soft value is closer to one constellation point than another.

Figure 4:
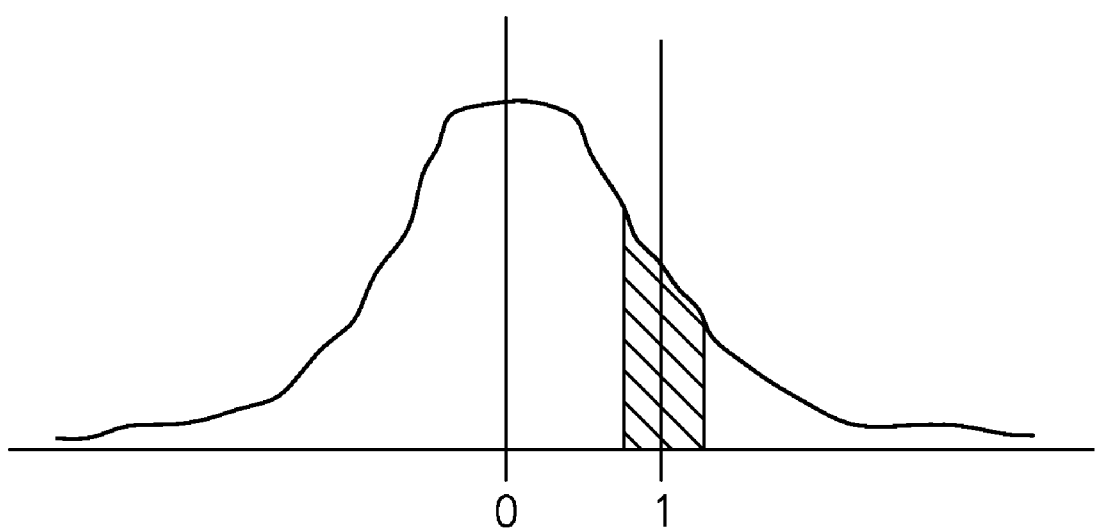
FIG. 4 is a diagram illustrating the probability density function of the received noise.

To evaluate the performance, we look at the c QAM symbols with worst reliability and consider how many of these are actual errors. To perform this, consider the case of an error with magnitude close to 1, i.e. close to the middle point between constellation points. The probability density function of the noise is shown in FIG. 4. The probability of having an error with magnitude close to 1 is represented by the shaded area. The right portion of this area corresponds to an error while the left portion corresponds to a correct decision. Therefore, the probability of having an error, given that the error magnitude is close to 1, equals the area of the right shaded portion divided by the area of the whole shaded portion. This probability is therefore always less than 0.5, and it approaches 0.5 when the definition of 'close to 1' is made more and more narrow.

We are not interested, however, in the unconditioned probability to mark an error, but in the probability to mark an error given that it is uncorrectable with standard hard decoding. This probability will be higher than 0.5, since usually only a few noise samples are close to 1. If we know that at least nine noise samples are larger than 1, it is reasonable that the QAM symbols having the worst reliability comprise these errors. This conditional probability is difficult to calculate analytically. Consider the example case of a DOCSIS system using RS codes with correction capability of T=8 errors and 256-QAM modulation and using simulations at an SNR of 28 dB. The result is that if we look at the two bytes having the worst reliability and check all the cases where there were exactly nine errors, then in 70% of these cases both marked positions were errors. At 20% of the cases only one location was in error, and at 10% none were in error. Note that for T=8 we assume that most of the errors for standard hard decoding are cases with exactly nine errors. Using this result, we can evaluate the performance of the system implementing the Chase algorithm.

Differentially Decoded System

Figure 3:
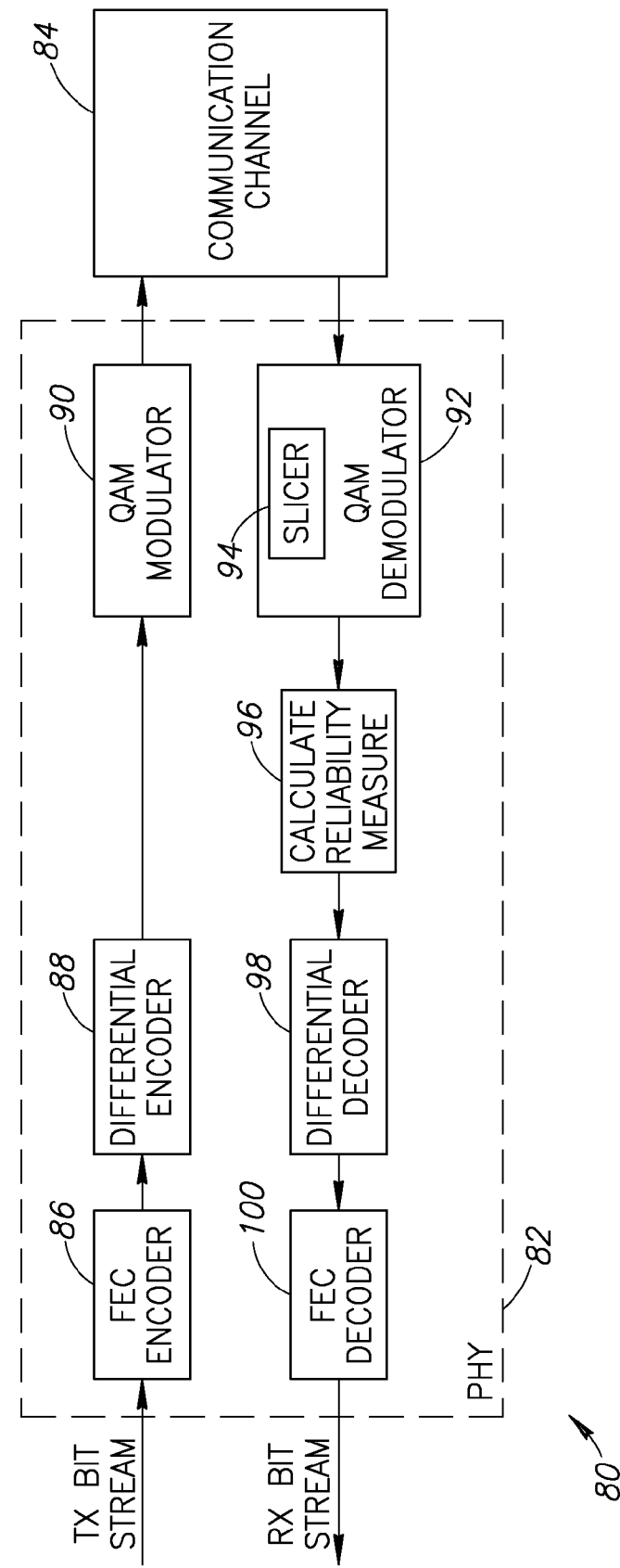
FIG. 3 is a block diagram illustrating a second example coding scheme incorporating a differential decoder.

A block diagram illustrating a second example coding scheme without a differential decoder is shown in FIG. 3. The decoding scheme, generally referenced 80, comprises a PHY circuit 82 coupled to a communications channel 84. The PHY circuit comprises a transmit portion comprising a FEC encoder 86 (e.g., Reed Solomon encoder) adapted to encode the TX bit stream, a differential encoder 88 and a QAM modulator 90. The receive portion of the PHY comprises a QAM demodulator 92 incorporating a slicer 94, reliability measure calculation block 96, differential decoder 98 and FEC decoder 100 (e.g., Reed Solomon decoder) for generating the RX bit stream.

It is common, especially in QAM systems, to incorporate a differential encoder before the QAM modulator and a differential decoder module after the QAM demodulator as shown in FIG. 3. A system with differential encoding/decoding is robust to constant phase shifts of 90 degrees, 180 degrees and 270 degrees in the QAM constellation. The differential encoder actually encodes the two MSBs of the constellation point, which are the bits that define the quadrant of the constellation point.

It is noted that the chase algorithm can be difficult to implement for a system that uses a differential encoder/decoder. The algorithm requires the QAM demodulator to output two hard decision candidates for each constellation point. The first candidate has a better probability to be the correct decision than the second candidate. If the first and second candidates are located in the same quadrant then each of the candidates are input to the differential decoder, with no impact on its output. If the second candidate is located in a different quadrant than the first candidate (defined as a boundary point of the slicer output), then we implement the decoder as a trellis scheme comprising two branches. One branch is for the differential decoder with the first candidate, and the second branch is for the differential decoder with the second candidate. Since the differential decoder has a memory of length one (i.e. one for I and one for Q), we can split the two branches into a maximum of four branches. Keeping tracking of this trellis is both complicated and has a higher associated cost to implement.

Therefore, in accordance with the present invention, a differential decoder is provided that uses only two branches for the decoded data: a first branch for the first candidate and a second branch for the second candidate. Each branch is differentially decoded separately and the two outputs of the differential decoders comprise the first and second output MSBs.

Figure 5:
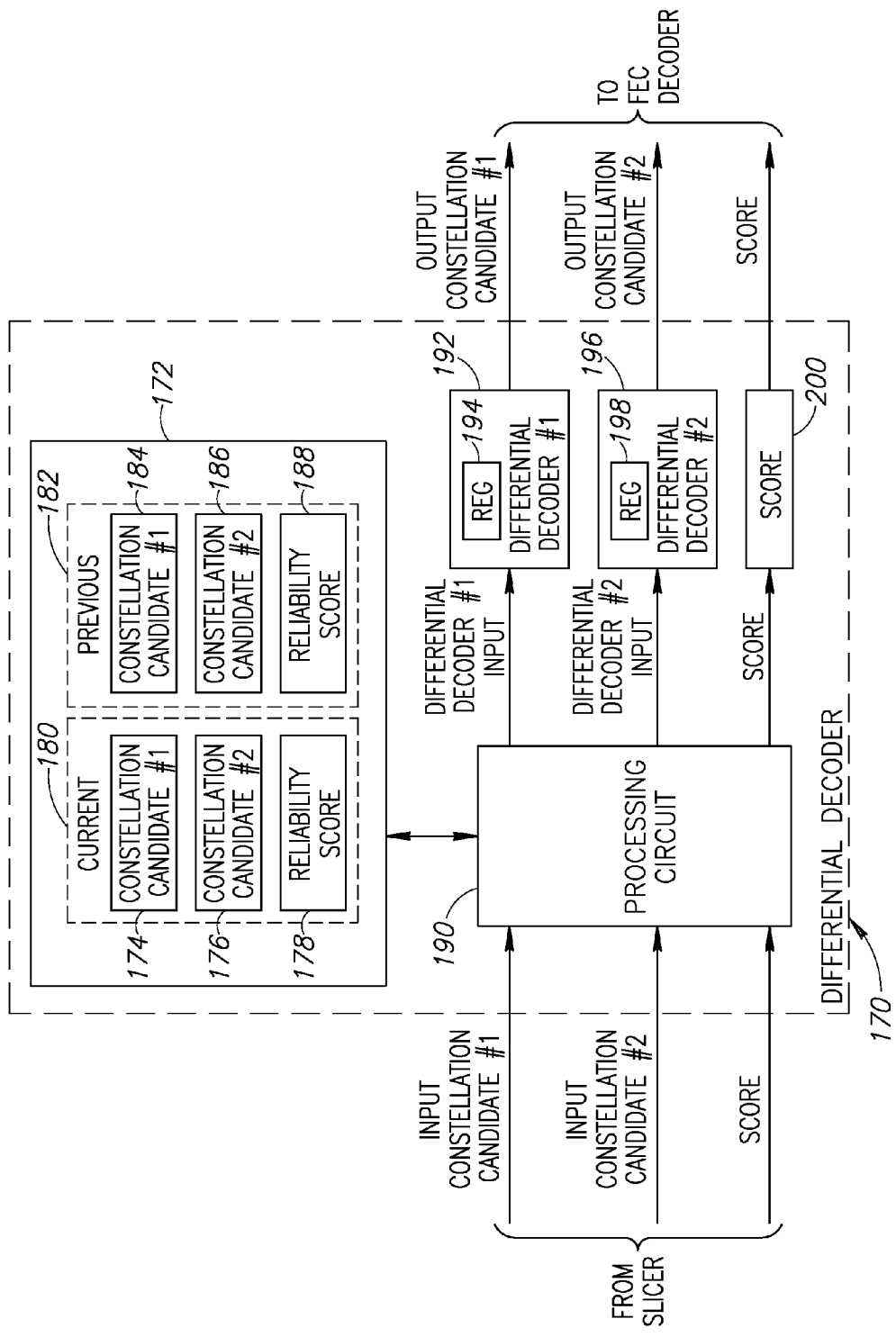
FIG. 5 is a block diagram illustrating an exemplary embodiment of the differential decoder of the present invention.

A block diagram illustrating an exemplary embodiment of the differential decoder of the present invention is shown in FIG. 5. The differential decoder, generally referenced 170, comprises a memory 172 processing logic circuit 190, differential decoders #1 192, and #2 198 and output score memory register storage 200. The memory block 172 comprises storage for a current symbol point (i.e. decoder input) 180 and a previous symbol point 182. The current symbol point comprises a constellation candidate #1 174 and #2 176 and an input reliability score 178. Similarly, the previous symbol point 182 comprises a constellation candidate #1 184 and #2 186 and an input reliability score 188.

The processing circuit 190 may comprise hardware, software or a combination of hardware and software. Examples include, but are not limited to, a DSP core, custom logic, etc., a general purpose processor programmed to implement the decider mechanism of the invention, etc. The processing circuit is operative to receive from the slicer output the symbol point at the decoder input which comprises two input constellation points #1 and #2 and an input reliability measure or score. The processing circuit is operative to generate the inputs to the differential decoders #1 192 and #2 196 and the output score 200. Differential decoder #1 192 comprises a memory of one 194. Similarly, Differential decoder #2 196 comprises a memory of one 198. Differential decoder #1 functions to generate the output constellation candidate #1 while differential decoder #2 functions to generate the output constellation candidate #2. Output constellation candidates #1 and #2 and the output score are output to the FEC decoder (e.g., the Reed Solomon decoder) 100 (FIG. 3).

Figure 6A:
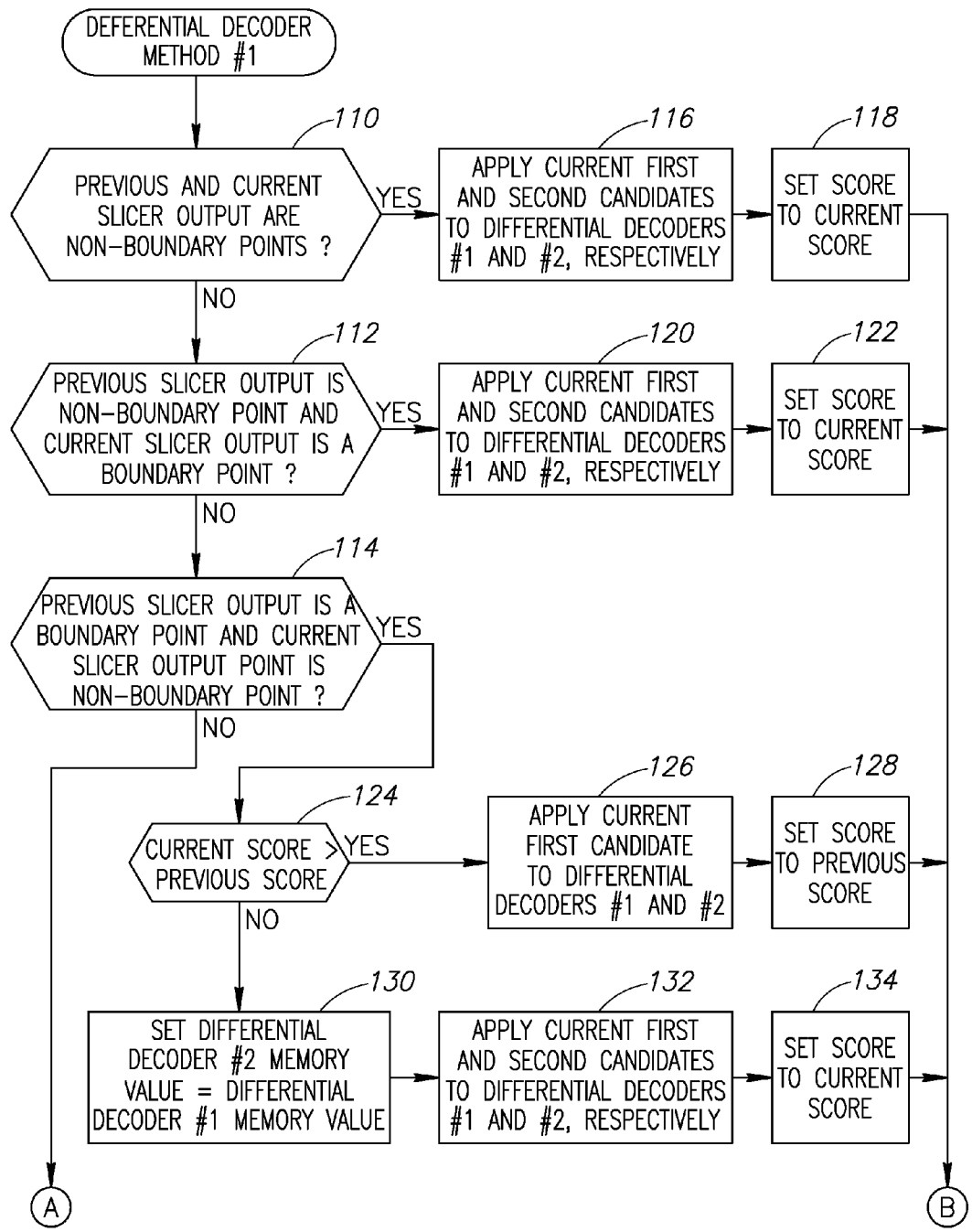
FIGS. 6A and 6B are a flow diagram illustrating a first differential decoder method of the present invention.
Figure 6B:
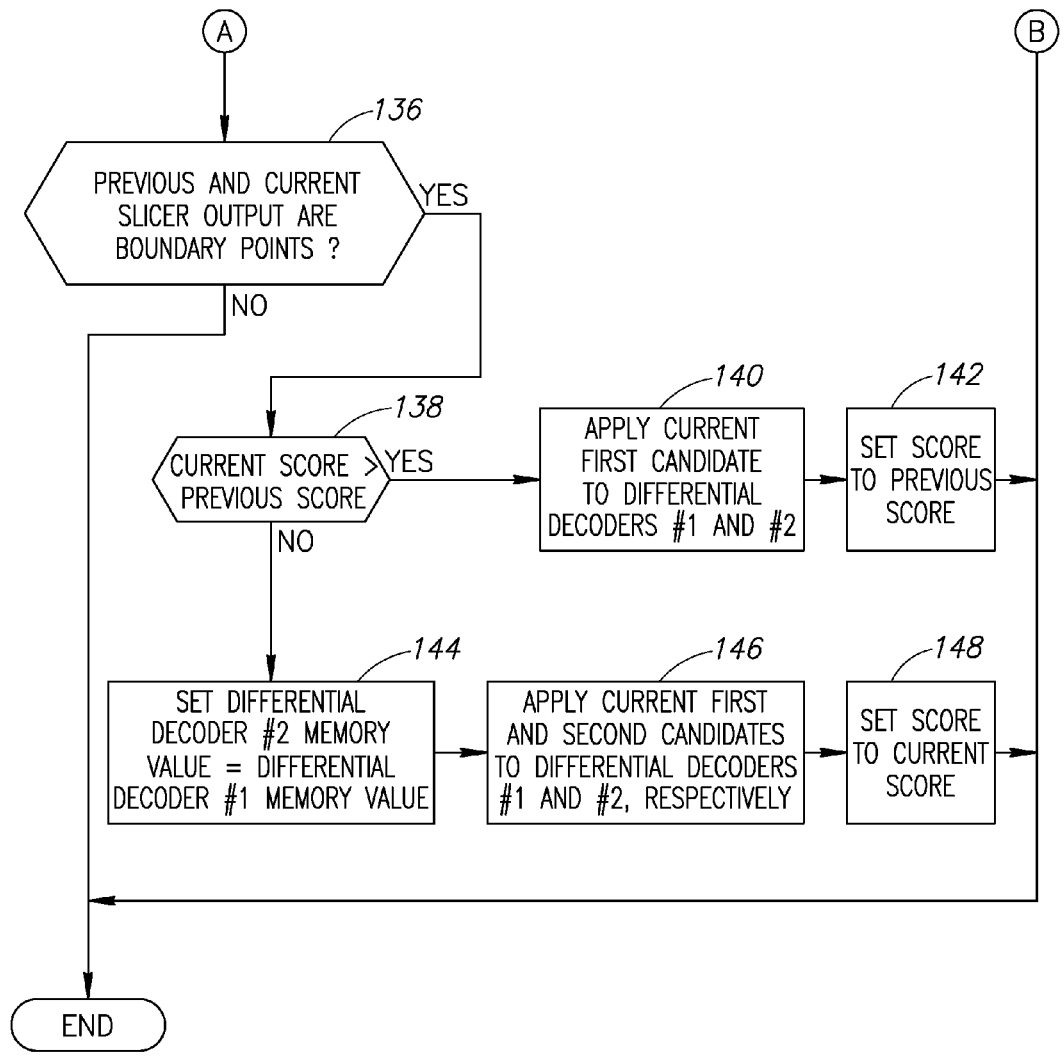

The operation of the processing circuit will now be described in more detail. A flow diagram illustrating a first differential decoder method of the present invention is shown in FIGS. 6A and 6B. With reference to FIGS. 5 and 6, the operation of the processing logic can be described as a series of case statements. Note that a point is defined as a first and second constellation candidate pair. A boundary point is a point whose two constellation candidates lie in different quadrants. In contrast, a non-boundary point is a point whose two constellation candidates lie in the same quadrant. The slicer output is defined as the first and second constellation candidates output from the slicer and input to the decoder along with the reliability measure or score.

Case I:
If the previous slicer output point and the current slicer output are both non-boundary points (i.e. all four candidates lie in the same quadrant) (step 110), then the current first and second candidates are applied to differential decoders #1 and #2, respectively (step 116). The output score is set to the current input score (step 118). The method then returns to process the next decoder input point. Thus, in this case, the decoder input effectively passes through the decoder to the output without any changes.

Case II:
If the previous slicer output is a non-boundary point and the current slicer output is a boundary point (step 112), then the current first and second candidates are applied to differential decoders #1 and #2, respectively (step 120). The output score is set to the current input score (step 122). The method then returns to process the next decoder input point. Thus, as in Case I above, the decoder input effectively passes through the decoder to the output without any changes.

Case III:
If the previous slicer output is a boundary point and the current slicer output is a non-boundary point (step 114), then it is then checked if the current reliability score is bigger than the previous reliability score (step 124). If so, it means that the current input point potentially has a good score and it is preferred to eliminate its second candidate rather than the second candidate of the previous input point. In this case, the current first candidate is applied to both differential decoders #1 and #2 (step 126). In this manner, two of the four options are eliminated. The output score is set to the previous input score (step 128). The method then returns to process the next decoder input point.

It is noted that because there is memory in each differential decoder #1 and #2, every output is influenced by two inputs. If one input is corrupted, it will effect two output values. Due to the fact that we are deciding the current point in accordance with the previous point which has a worse score, the output of the decoder cannot be given a good reliability score. This is because it was effected from the previous point which had a bad score. the current point cannot be given a good score because it was 'manipulated' by the previous point. The decoder output thus should be the worst of both scores.

If the current reliability score is not bigger than the previous reliability score (step 124), it means that the current input point potentially has a bad score and it is preferred to eliminate the second candidate of the previous input point rather than the second candidate of the current input point. In this case, the memory value of differential decoder #2 is set equal to the memory value of differential decoder #1 (step 130). In this manner, two of the four options are eliminated. The current first candidate is then applied to differential decoder #1 and the current second candidate is applied to differential decoder #2 (step 132). The output score is set to the current input score (step 134). The method then returns to process the next decoder input point.

Case IV:

If both the previous and the current slicer output are boundary points (step 136), then it is then checked if the current reliability score is bigger than the previous reliability score (step 138). If so, it means that the current input point potentially has a good score and it is preferred to eliminate its second candidate rather than the second candidate of the previous input point. In this case, the current first candidate is applied to both differential decoders #1 and #2 (step 140). In this manner, two of the four options are eliminated. The output score is set to the previous input score (step 142). The method then returns to process the next decoder input point.

If the current reliability score is not bigger than the previous reliability score (step 138), it means that the current input point potentially has a bad score and it is preferred to eliminate the second candidate of the previous input point rather than the second candidate of the current input point. In this case, the memory value of differential decoder #2 is set equal to the memory value of differential decoder #1 (step 144). In this manner, two of the four options are eliminated. The current first candidate is then applied to differential decoder #1 and the current second candidate is applied to differential decoder #2 (step 146). The output score is set to the current input score (step 148). The method then returns to process the next decoder input point.

Figure 7:
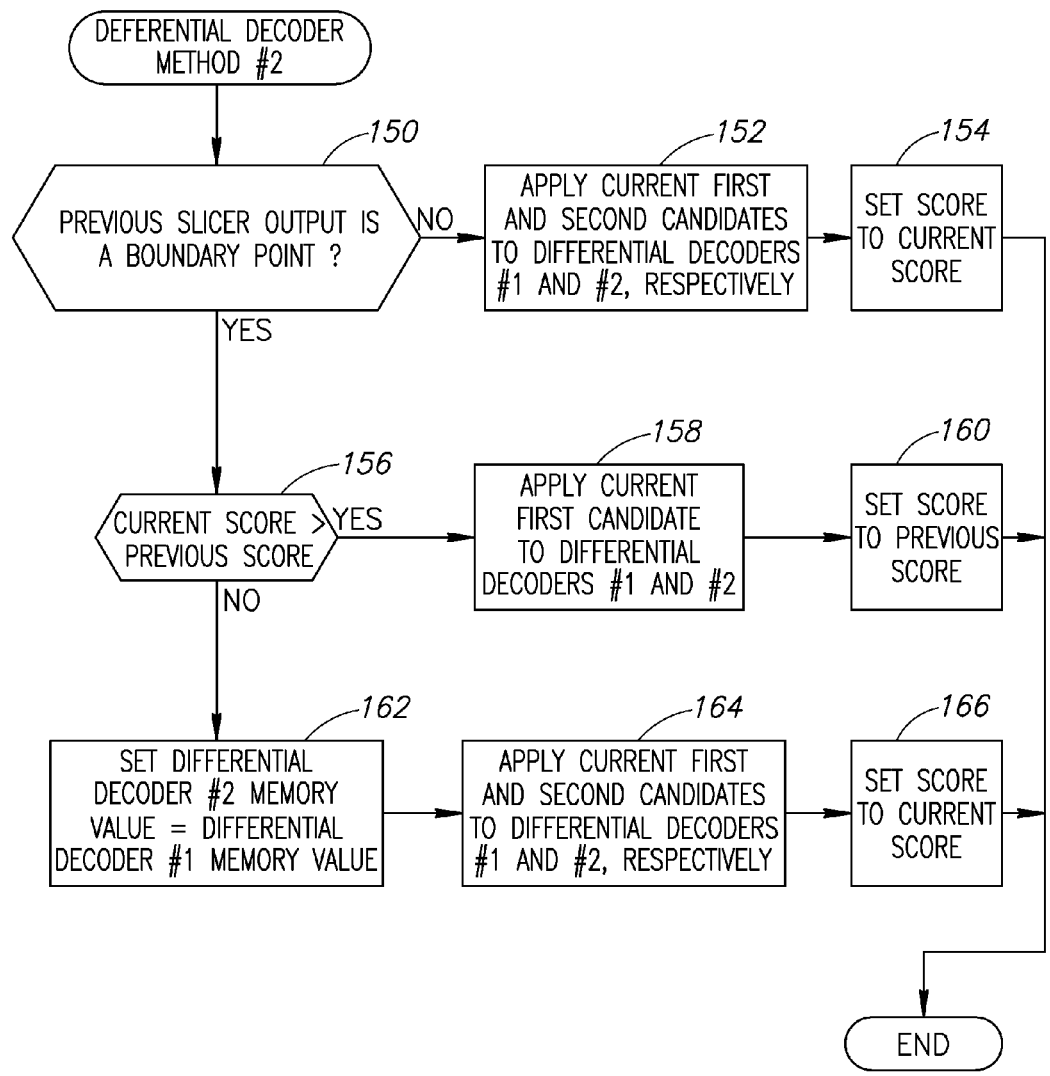
FIG. 7 is a flow diagram illustrating a second differential decoder method of the present invention.

An examination of the method of FIG. 6 reveals that the second candidate is eliminated only when the previous slicer output is a boundary point. Thus, the method can be collapsed from four to two cases. A flow diagram illustrating a second differential decoder method of the present invention is shown in FIG. 7.

If the previous slicer output point is not a boundary point (step 150), then the current first and second candidates are applied to differential decoders #1 and #2, respectively (step 152). The output score is set to the current input score (step 154). The method then returns to process the next decoder input point. Thus, in this case, the decoder input effectively passes through the decoder to the output without any changes.

If the previous slicer output is a boundary point (step 150), then it is then checked if the current reliability score is bigger than the previous reliability score (step 156). If so, it means that the current input point potentially has a good score and it is preferred to eliminate its second candidate rather than the second candidate of the previous input point. In this case, the current first candidate is applied to both differential decoders #1 and #2 (step 158). In this manner, two of the four options are eliminated. The output score is set to the previous input score (step 160). The method then returns to process the next decoder input point.

If the current reliability score is not bigger than the previous reliability score (step 156), it means that the current input point potentially has a bad score and it is preferred to eliminate the second candidate of the previous input point rather than the second candidate of the current input point. In this case, the memory value of differential decoder #2 is set equal to the memory value of differential decoder #1 (step 162). In this manner, two of the four options are eliminated. The current first candidate is then applied to differential decoder #1 and the current second candidate is applied to differential decoder #2 (step 164). The output score is set to the current input score (step 166). The method then returns to process the next decoder input point.

Simulation Results

Figure 8:
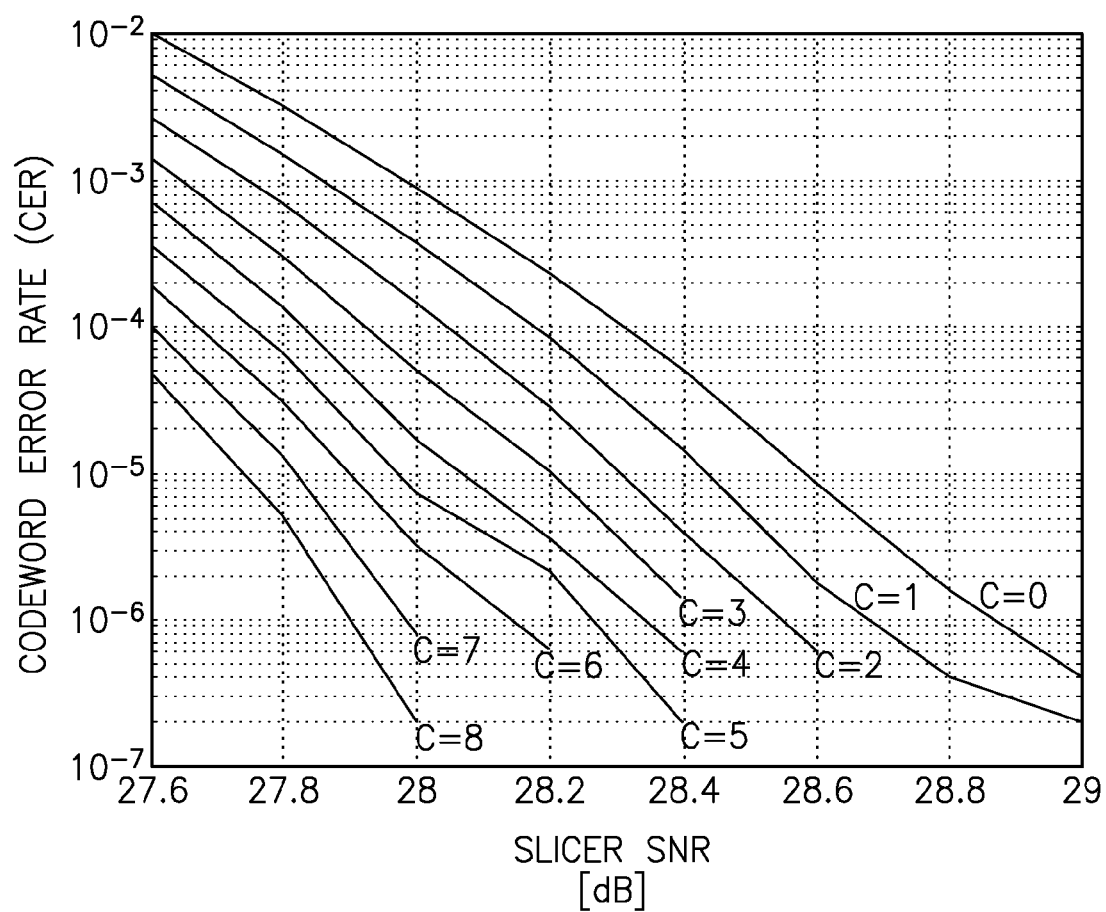
FIG. 8 is a first diagram illustrating the simulation results of a system implementing the Chase algorithm with the differential decoder of the present invention.

A first diagram illustrating the simulation results of a system implementing the Chase algorithm with the differential decoder of the present invention is shown in FIG. 8. The performance of the Chase algorithm is shown as the results of a simulation of $5 \times 10^6$ codewords (i.e. about $10^9$ bytes). The parameter c represents the number of symbols processed by the Chase algorithm. The performance for a range of values of c is presented with c=0 representing the reference case of no algorithm at all.

The performance gain of the Chase algorithm is summarized in the following Table 1. The number of hard decoding attempts per codeword represents the number of options per symbol wherein each symbol is associated with two candidates. Thus, two symbols represents four options. The example presented herein implements a system with a value c=3 or eight hard decoding attempts per codeword.

TABLE 1

Performance of the Chase algorithm

| Chase parameter c | Number of hard decoding attempts per codeword ($2^c$) | Performance gain [dB] |
|---|---|---|
| 0 | 1 | 0 |
| 1 | 2 | 0.2 |
| 2 | 4 | 0.3 |
| 3 | 8 | 0.4 |
| 4 | 16 | 0.5 |
| 5 | 32 | 0.6 |
| 6 | 64 | 0.7 |
| 7 | 128 | 0.8 |
| 8 | 256 | 0.9 |

Note that the larger the number of symbols processed by the chase algorithm, the larger the performance gain achieved.

Figure 9:
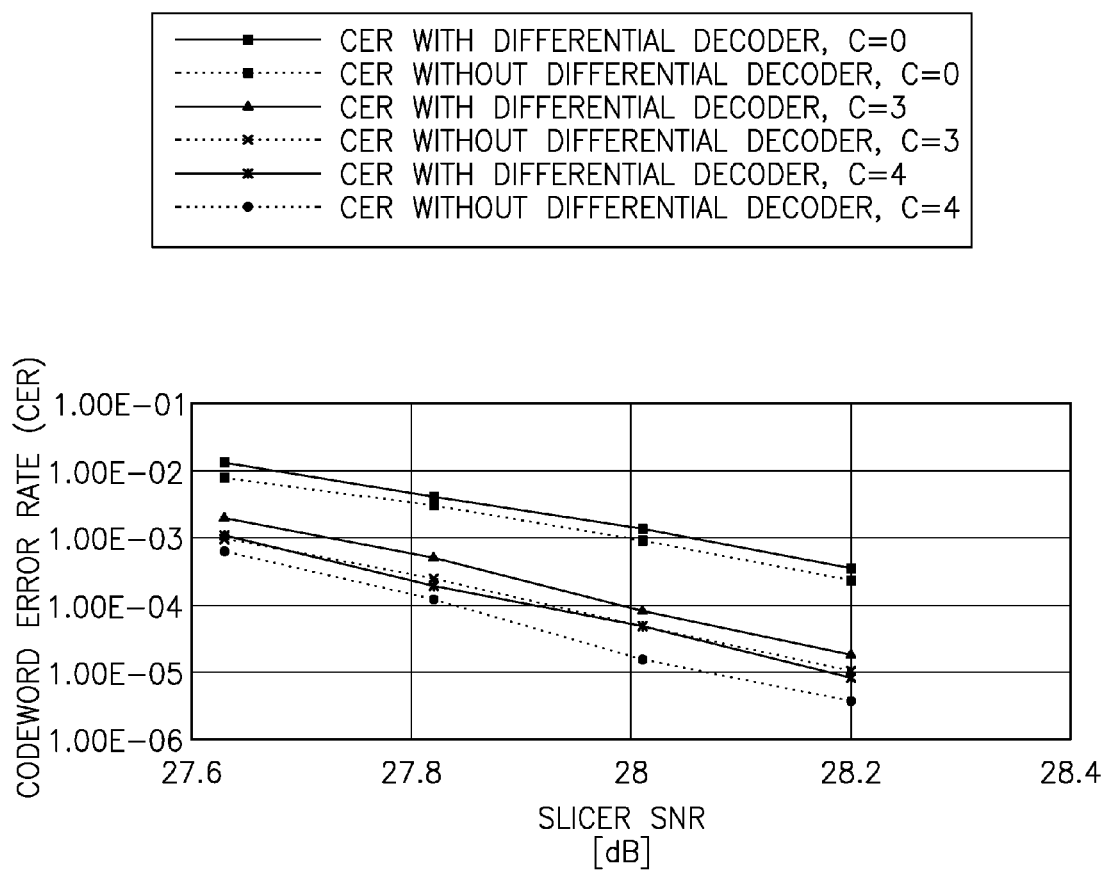
FIG. 9 is a second diagram illustrating the simulation results of a system implementing the Chase algorithm with the differential decoder of the present invention.

A second diagram illustrating the simulation results of a system implementing the Chase algorithm with the differential decoder of the present invention is shown in FIG. 9. The traces in this Figure present the results of a second simulation with and without the differential decoder of the present invention. It is well known that when c=0 the differential decoder causes a performance of approximately 0.1 dB, or 35% more packet loss compared to the case of no differential decoder. This is due to the fact that a single error can cause two consequent errors in a differentially modulated system. It can also be seen that the performance gain of the Chase algorithm, for c=3 and 4 in this example, is evenly maintained with the differential decoder.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of differential decoding for use in a differential decoder having a first branch for a first candidate and a second branch for a second candidate, said method comprising the steps of:
    determining whether a previous decoder input is a boundary point, and if not, applying a current first candidate to a first differential decoder in said first branch, applying a current second candidate to a second differential decoder in said second branch and setting an output score to a current input score;
    if a previous decoder input is a boundary point and a current input score is greater than a previous input score, applying a current first candidate to said first differential decoder and said second differential decoder and setting said output score to said previous input score; and
    if a previous decoder input is a boundary point and a current input score is not greater than a previous input score, setting a memory of said second differential decoder to value of memory of said first differential decoder, applying a current first candidate and a current second candidate to said first differential decoder and second differential decoder, respectively, and setting said output score to a current input score.

2. The method according to claim 1, wherein said input score comprises a measure of reliability of a decoder input.

3. The method according to claim 1, wherein said boundary point comprises a detected symbol whose first candidate and second candidate are located in different quadrants.

4. The method according to claim 1, wherein said non-boundary point comprises a detected symbol whose first candidate and second candidate are located in the same quadrant.

5. The method according to claim 1, wherein said method is operative to reduce the number of symbol options to be considered from four to two.

6. The method according to claim 1, wherein said first differential decoder and said second differential decoder comprises a memory length of one.

7. A differential decoder, comprising:
    a memory for storing a current decoder input and a previous decoder input each comprising a first candidate, a second candidate and a reliability score;
    a first branch comprising a first differential decoder and corresponding to said first candidate;
    a second branch comprising a second differential decoder and corresponding to said second candidate;
    a processing circuit operative to:
        determine whether a previous decoder input is a boundary point, and if not, apply a current first candidate to said first differential decoder, apply a current second candidate to said second differential decoder;
        apply a current first candidate to said first differential decoder and said second differential decoder if a previous decoder input is a boundary point and a current input score is greater than a previous input score; and
        set a second differential decoder memory to the contents of a first differential decoder memory, apply a current first candidate and a current second candidate to said first differential decoder and said second differential decoder, respectively, if a previous decoder input is a boundary point and a current input score is not greater than a previous input score.

8. The differential decoder according to claim 7, wherein said processing circuit is operative to:
    set an output score to a current input score if a previous decoder input is a boundary point or if a previous decoder input is a boundary point and a current input score is not greater than previous input score; and
    set said output score to a previous input score if a previous decoder input is a boundary point and a current input score is greater than a previous input score.

9. The differential decoder according to claim 7, wherein said input score comprises a measure of reliability of a decoder input.

10. The differential decoder according to claim 7, wherein said boundary point comprises a detected symbol whose first candidate and second candidate are located in different quadrants.

11. The differential decoder according to claim 7, wherein said non-boundary point comprises a detected symbol whose first candidate and second candidate are located in the same quadrant.

12. The differential decoder according to claim 7, wherein said method is operative to reduce the number of symbol options to be considered from four to two.

13. The differential decoder according to claim 7, wherein said first differential decoder and said second differential decoder comprises a memory length of one.

14. A method of differential decoding, said method comprising the steps of:
    providing a first branch for a first candidate and a second branch for a second candidate, wherein said first branch and said second branch are decoded by a first differential decoder and second differential decoder, respectively;
    applying a current first candidate and current second candidate to said first differential decoder and said second differential decoder, respectively, if a previous decoder input is not a boundary point;
    eliminating a second candidate of a current decoder input if a previous decoder input is a boundary point and a current input score is greater than a previous input score; and
    eliminating a second candidate of a previous decoder input if a previous decoder input is a boundary point and a current input score is not greater than a previous input score.

15. The method according to claim 14, further comprising the steps of:
    setting an output score to a current input score if a previous decoder input is a boundary point or if a previous decoder input is a boundary point and a current input score is not greater than previous input score; and
    setting said output score to a previous input score if a previous decoder input is a boundary point and a current input score is greater than a previous input score.

16. The method according to claim 14, wherein said input score comprises a measure of reliability of a decoder input.

17. The method according to claim 14, wherein said boundary point comprises a detected symbol whose first candidate and second candidate are located in different quadrants.

18. The method according to claim 14, wherein said non-boundary point comprises a detected symbol whose first candidate and second candidate are located in the same quadrant.

19. The method according to claim 14, wherein said method is operative to reduce the number of symbol options to be considered from four to two.

20. The method according to claim 14, wherein said first differential decoder and said second differential decoder comprises a memory length of one.

21. A cable modem, comprising:
a memory;
one or more interface ports;
a tuner coupled to a CATV cable having a plurality of channels, said tuner operative to tune a received broadband signal in accordance with a tune command;
a PHY circuit coupled to said tuner and operative to generate a baseband signal from the output of said tuner, said PHY circuit comprising a differential decoder unit, said differential decoder unit comprising:
  a memory for storing a current decoder input and a previous decoder input each comprising a first candidate, a second candidate and a reliability score;
  a first branch comprising a first differential decoder and corresponding to said first candidate;
  a second branch comprising a second differential decoder and corresponding to said second candidate;
  a processing circuit operative to:
    determine whether a previous decoder input is a boundary point, and if not, apply a current first candidate to said first differential decoder, apply a current second candidate to said second differential decoder;
    apply a current first candidate to said first differential decoder and said second differential decoder if a previous decoder input is a boundary point and a current input score is greater than previous input score;
    set a second differential decoder memory to the contents of a first differential decoder memory, apply a current first candidate and a current second candidate to said first differential decoder and said second differential decoder, respectively, if a previous decoder input is a boundary point and a current input score is not greater than a previous input score; and
a processor coupled to said memory, said one or more interface ports, said tuner and said PHY circuit, said processor operative to implement a media access control (MAC) layer.

22. The cable modem according to claim 21, wherein said plurality of channels comprises Data Over Cable Service Interface Specification (DOCSIS) channels.

23. The cable modem according to claim 21, wherein said processing circuit is operative to:
set an output score to a current input score if a previous decoder input is a boundary point or if a previous decoder input is a boundary point and a current input score is not greater than a previous input score; and
set said output score to a previous input score if a previous decoder input is a boundary point and a current input score is greater than previous input score.

* * * * *